E. M. WILLIAMS.
COMBINED FERTILIZER, DISTRIBUTER AND GRAIN-SOWER.

No. 178,574. Patented June 13, 1876.

Witnesses:
H. A. Daniels
Theodore Mungen

Inventor:
Edward M. Williams
By W. Burris
Atty.

N. PETERS, PHOTO-LITHOGRAPHER, WASHINGTON, D. C.

UNITED STATES PATENT OFFICE.

EDWARD M. WILLIAMS, OF GILEAD, MICHIGAN.

IMPROVEMENT IN COMBINED FERTILIZER-DISTRIBUTERS AND GRAIN-SOWERS.

Specification forming part of Letters Patent No. 178,574, dated June 13, 1876; application filed November 20, 1875.

*To all whom it may concern:*

Be it known that I, EDWARD M. WILLIAMS, of Gilead, in the county of Branch, and State of Michigan, have invented certain new and useful Improvements in Combined Fertilizers and Grain-Sowers; and I do hereby declare that the following is a full, clear, and exact description thereof, which will enable others skilled in the art to which it pertains to make and use the same, reference being had to the accompanying drawings, and to the letters of reference marked thereon, which form a part of this specification, in which drawings—

Figure 1:
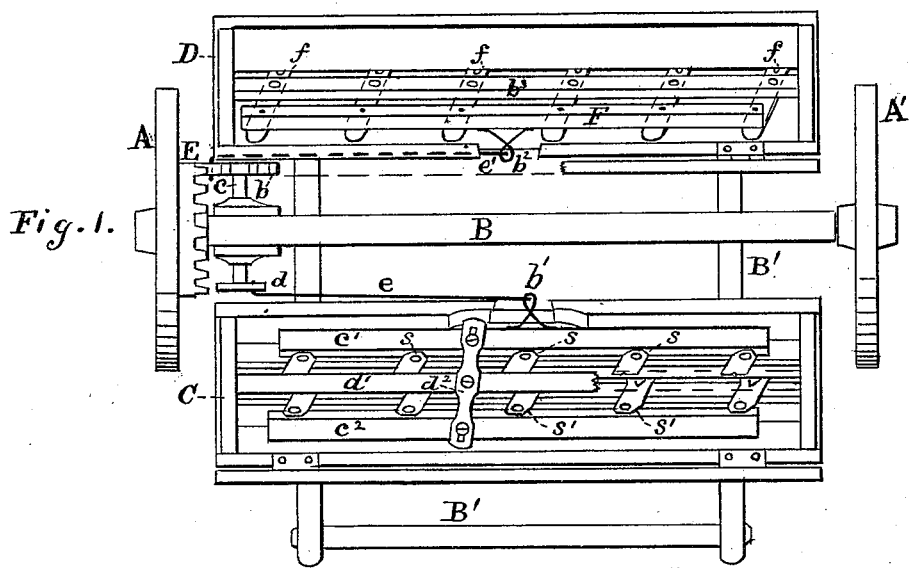
Figure 2:
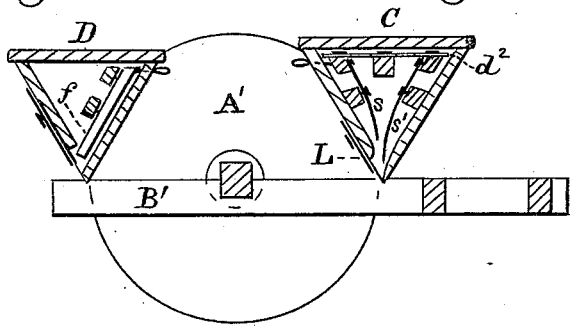
Figure 3:
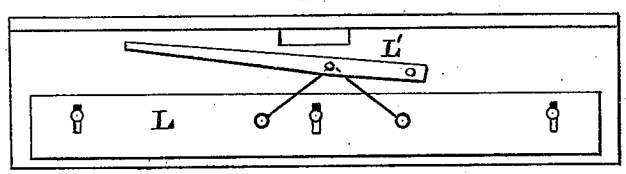
Figure 4:
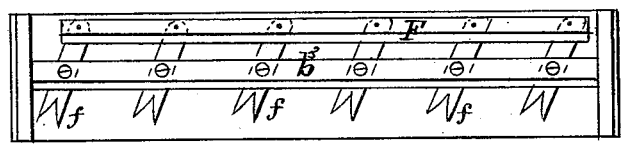

Figure 1 is a top view. Fig. 2 is a transverse section. Fig. 3 is a back view of the fertilizer, showing the adjustable gate. Fig. 4 is a longitudinal section of the sower, showing the interior construction.

My invention relates to combined fertilizers and broad-cast sowers; and consists in the devices for stirring and spreading the fertilizers and sowing grain, as hereinafter fully described.

A A' are the wheels; B, the axle, and B' the frame carrying the fertilizer C and grain-sower D. E is a cog-wheel attached to the inner face of wheel A, and adjusted to engage the pinion $b$ on the end of shaft $c$, having its bearings on the axle B. Attached to the other end of the shaft $c$ is a plane-wheel, $d$, provided with holes to receive the end of the connecting-rod $e$, the other end of which rod connects, by a hook or eye at $b'$, with one of the movable bars $c^1$ $c^2$ in the fertilizer. These bars are connected and operated a lever, $d^2$, pivoted in the middle to a fixed bar, $d^1$, and provided at the ends with slots to receive pins in the movable bars, as shown in Fig. 1 of the drawings. Stirrers $s$ $s'$ are pivoted in the middle to fixed bars and at the top to the movable bars $c^1$ $c^2$, $s$ being adjusted to stir the middle, and $s'$ extending lower and into the exit-opening to thoroughly stir and spread the fertilizer as it passes out of the machine. And to facilitate the stirring and pulverizing operation the two sets of stirrers are adjusted to oscillate simultaneously in opposite directions to each other. L is an adjustable gate arranged on the side of the fertilizer-box to be operated by a lever, L', to regulate the flow of the fertilizer or small grain from the machine, which may be used either as a fertilizer or as a grain-sower.

The grain-sower D is provided with oscillating fingers $f$ pivoted at the top to a movable bar, F, and at the middle to a fixed bar, $b^3$, and extended downward to near the bottom of the grain-box.

The movable bar F is operated by a connecting-rod, $e'$, attached to the bar at one end by an eye or hook at $b^2$, and at the other end to the pinion $b$; and the reciprocating motion of the bar imparts the oscillating motion to the fingers, thoroughly stirring the grain in the box. The sower is provided with the usual adjustable gate for regulating the flow of the grain, and both machines are operated by the same drive-wheel, as shown and described.

What I claim as new, and desire to secure by Letters Patent, is—

The fertilizer-distributer provided with the two sets of oscillating stirrers $s$ $s'$ pivoted to fixed and movable bars in the hopper, and adapted to oscillate simultaneously in opposite directions to each other, and to stir the middle and lower portion of the fertilizers or grain, and actuated by mechanism, substantially as described.

In testimony that I claim the foregoing as my own invention I affix my signature in presence of two witnesses.

EDWARD M. WILLIAMS.

Witnesses:
D. S. FELLONS,
M. D. WOOLF.